Nov. 13, 1934.   A. F. BRADLEY   1,980,661
BALE TIE
Filed Dec. 27, 1932
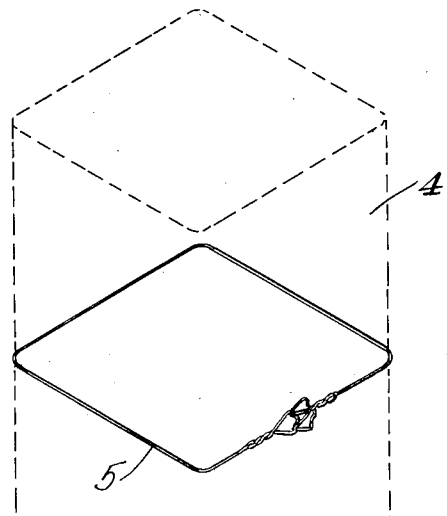
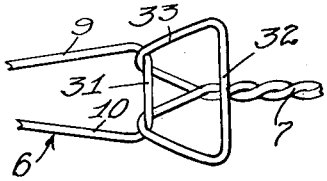
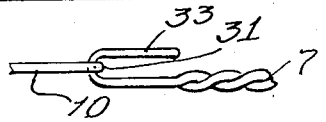
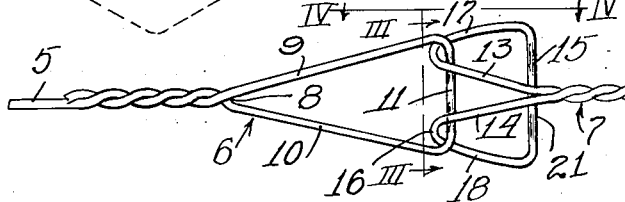
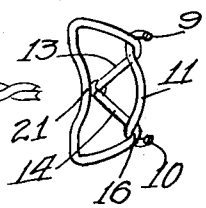
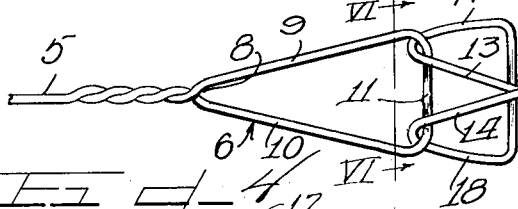
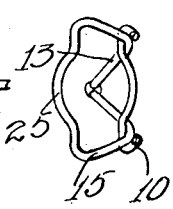
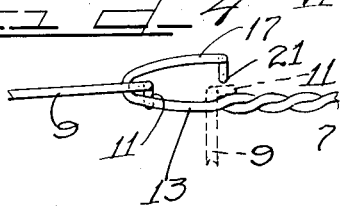
Inventor
Albert F. Bradley
By Charles Hill
Attys.

Patented Nov. 13, 1934

1,980,661

UNITED STATES PATENT OFFICE 1,980,661

BALE TIE

Albert F. Bradley, Sterling, Ill., assignor to Northwestern Barb Wire Company, Sterling, Ill., a corporation of Illinois Application December 27, 1932, Serial No. 648,917

15 Claims. (Cl. 24—27)

This invention relates to a bale tie and more particularly to a tie element including improved cooperating portions for forming an interlocking arrangement, whereby the ends of a tie are securely held together.

An object of this invention is the provision of an improved bale tie including means whereby the parts are restrained from accidental disengagement in case the tie should become slack.

A further object is the provision of an improved tie, the parts of which will be restrained from axial movement, of any substantial amount, by reason of frictional binding action between the parts thereby preventing movement of the parts sufficiently to permit their disengagement by relative angular movement.

Other objects and advantages of this invention will become apparent from the following detailed description of the same.

On the drawing:

Figure 1 is a perspective view of a bale of material such as cotton, shown in phantom and illustrating the use of a bale tie incorporating my invention.

Figure 2 is a fragmentary elevational view of a bale tie incorporating my invention.

Figure 3 is a vertical section taken on the line III—III of Figure 2.

Figure 4 is a fragmentary plan view of that shown in Figure 2, being taken on the line IV—IV of Figure 2 and looking in the direction of the arrows. This figure also illustrates in broken line the manner in which the portions of the tie may be disengaged.

Figure 5 is an elevational view similar to Figure 2 but showing a modification of my invention.

Figure 6 is a vertical section taken on the line VI—VI of Figure 5.

Figure 7 is a fragmentary elevation of another modification of my invention taken from the side normally disposed toward the bale.

Figure 8 is a bottom plan of that shown in Figure 7.

As shown on the drawing:

For the purpose of illustration I have shown in the drawing a bale tie 5 applied to a bale of cotton or the like 4 illustrated in phantom. The tie 5 has formed integral therewith two tie ends 6 and 7 respectively which are formed in a manner to interlock and cooperate with each other to prevent accidental disengagement thereof. The tie end 6 is preferably in the form of a triangle, the apex 8 being on the longitudinal axis of the tie, with the sides 9 and 10 diverging therefrom to points substantially spaced from the longitudinal axis and being connected together by a base portion 11 which is deformed intermediate its ends in a manner to engage between the diverging portions 13 and 14 of the hook member on the end 7. A hook portion or bight 15, connecting the ends of the diverging portions 13 and 14 extends a greater distance at right angles to the longitudinal axis of the tie, than does the base portion 11 of the tie end 6, and the width of the hook portion at the place of bending indicated at 16 is such that a slight amount of longitudinal movement of the tie ends toward each other causes a binding engagement between the side portions 9 and 10 on the triangular loop and portions 17 and 18 respectively, in addition to the binding engagement between the deformed portion 11 on the loop 6 and the diverging portions 13 and 14 between which it is disposed. The bight 15 also has its central portion deformed in the same direction as is the central portion of the base 11, to restrict the passageway of the base 11 in its disengaging movement as illustrated in Figure 4.

In Figures 5 and 6 the bight portion of the hook is of modified construction in that a deformation or corrugation in the end of the hook extends outwardly from the axis of the tie as indicated at 25, instead of inwardly as in Figure 3.

In Figures 7 and 8 is shown another modification of this invention in which the ends 6 and 7 are of a somewhat simpler form. The loop 6 includes the diverging elements 9 and 10 and a base portion 31 which is in a plane with the diverging portions 9 and 10. The hook end 7 comprises a bight portion 32 formed from the base and diverging side 33 of a triangular loop. In this form of the invention the bight 32 is wider than the base 31 of the loop 6 such that it is necessary to rotate one end relative to the other before the same may become disengaged.

In the use of this invention it will be understood from an inspection of Figure 1 that the bight of the hook end is normally disposed adjacent the bale such that pressure from the bale will normally urge the bight toward the axis of the tie and further restrict the pathway of movement of the tie ends toward each other, thereby insuring a secure tie and effectively preventing accidental disengagement.

It will be understood from the foregoing description, together with the accompanying drawing that this invention is susceptible of various modifications without departing from the principles thereof. Accordingly I desire that the patent to be granted hereon shall not be limited in any manner except as necessitated by the prior art.

I claim as my invention:

1. In a bale tie, two cooperating tie ends, a permanently closed loop on one of said tie ends, said loop including a base portion at the forward end thereof and two side portions forming a triangle being widest at the base, a hook on the other said tie end including a return bent bight, said hook being wider at the end of the bight than is said loop at the base.

2. In a bale tie, two cooperating tie ends, a loop on one of said tie ends, said loop including a base portion at the forward end thereof and two side portions forming a triangle being widest at the base, a hook on the other said tie end including a return bent bight, said hook being wider at the end of the bight than is said loop at the base, the base of said triangular loop including a depressed central portion adapted to lockingly engage between portions of the hook and prevent accidental disengagement of the tie ends.

3. In a bale tie, two cooperating tie ends, a loop on one of said tie ends, said loop including a base portion at the forward end thereof and two side portions forming a triangle being widest at the base, a hook on the other said tie end including a return bent bight, said hook being wider at the end of the bight than is said loop at the base, said hook including a corrugated portion disposed to restrict the pathway of the triangular loop in disengaging movement.

4. In a bale tie, two cooperating tie ends, a loop on one of said tie ends, said loop including a base portion at the forward end thereof and two side portions forming a triangle being widest at the base, a hook on the other said tie end including a return bent bight, said hook being wider at the end of the bight than is said loop at the base, the base of said triangular loop including a depressed central portion adapted to lockingly engage between portions of the hook and prevent accidental disengagement of the tie ends, said hook including a corrugated portion deformed toward the axis of said tie to restrict the pathway of the triangular loop in disengaging movement.

5. In a bale tie, a bale element, two interlocking tie ends formed integral with the bale element, one of said tie ends defining a permanently closed triangular loop gradually diverging from the longitudinal axis of the tie, and a laterally extending base end connecting the diverging portions, the other tie end defining a loop return bent intermediate its length to form a hook, the sides of which gradually diverge from the longitudinal axis of the tie to substantially the end of the reversely extending part of the hook.

6. In a bale tie, a bale element, two interlocking tie ends formed integral with the bale element, one of said tie ends defining a permanently closed triangular loop gradually diverging from the longitudinal axis of the tie, and a laterally extending base end connecting the diverging portions, the other tie end defining a loop return bent intermediate its length to form a hook, the sides of which gradually diverge from the longitudinal axis of the tie to substantially the end of the reversely extending part of the hook, the relative width of the first said loop and the hook at the return bent portion being such as to cause binding and prevent direct longitudinal disengagement of the tie ends.

7. In a bale tie, a bale element, two interlocking tie ends formed integral with the bale element, one of said tie ends defining a triangular loop gradually diverging from the longitudinal axis of the tie, and a laterally extending base end connecting the diverging portions, the other tie end defining a loop return bent intermediate its length to form a hook, the sides of which gradually diverge from the longitudinal axis of the tie to substantially the end of the reversely extending part of the hook, the base of the triangular loop including a deformed portion intermediate its ends adapted to engage between and frictionally bind the diverging part of the hook loop upon longitudinal movement of the tie ends toward each other.

8. In a bale tie, a bale element, two interlocking tie ends formed integral with the bale element, one of said tie ends defining a triangular loop gradually diverging from the longitudinal axis of the tie, and a laterally extending base end connecting the diverging portions, the other tie end defining a loop return bent intermediate its length to form a hook, the sides of which gradually diverge from the longitudinal axis of the tie to substantially the end of the reversely extending part of the hook, the relative width of the first said loop and the hook at the return bent portion being such as to cause binding and prevent direct longitudinal disengagement of the tie ends, the base of the triangular loop including a deformed portion intermediate the ends adapted to engage between and frictionally bind the diverging parts of the hook loop upon longitudinal movement of the tie ends toward each other to prevent accidental disengagement.

9. In a bale tie, a bale element, two interlocking tie ends formed integral with the bale element, one of said tie ends defining a triangular loop gradually diverging from the longitudinal axis of the tie, and a laterally extending base end connecting the diverging portions, the other tie end defining a loop return bent intermediate its length to form a hook, the sides of which gradually diverge from the longitudinal axis of the tie to substantially the end of the reversely extending part of the hook, the relative width of the first said loop and the hook at the return bent portion being such as to cause binding and prevent direct longitudinal disengagement of the tie ends, said hook including a portion disposed to restrict the pathway of the triangular loop in disengaging movement.

10. In a bale tie, a bale element, two interlocking tie ends formed integral with the bale element, one of said tie ends defining a triangular loop gradually diverging from the longitudinal axis of the tie, and a laterally extending base end connecting the diverging portions, the other tie end defining a loop return bent intermediate its length to form a hook, the sides of which gradually diverge from the longitudinal axis of the tie to substantially the end of the reversely extending part of the hook, said hook including a corrugated portion disposed to cause restriction of the pathway of the triangular loop in disengaging movement to prevent accidental disengagement of the tie ends.

11. In a bale tie, a bale element, two interlocking tie ends formed integral with the bale element, one of said tie ends defining a triangular loop gradually diverging from the longitudinal axis of the tie, and a laterally extending base end connecting the diverging portions, the other tie end defining a loop return bent intermediate its length to form a hook, the sides of which gradually diverge from the longitudinal axis of the tie to substantially the end of the reversely extending part of the hook, the relative width of the first said loop and the hook at the return bent portion being such as to cause binding and prevent direct longitudinal disengagement of the tie ends, the base of the triangular loop including a deformed portion intermediate the ends adapted to engage between and frictionally bind the diverging parts of the hook loop upon longitudinal movement of the tie ends toward each other to prevent accidental disengagement, said hook including a corrugated portion disposed to cause restriction of the pathway of the triangular loop in disengaging movement to prevent accidental disengagement of the tie ends.

12. In a bale tie, two cooperating tie ends, one of said ends comprising a loop having a reinforcing portion at its bight, the other tie end comprising a loop return bent to constitute a hook for receiving said bight with said portion disposed between the sides of the hook loop so as to prevent collapse of said sides when the tie is subjected to tension due to the tendency of the baled material to expand.

13. In a bale tie, two cooperating tie ends, one of said ends comprising a loop, the other end comprising a loop return bent to constitute a hook for receiving the bight of the first loop, portions of the hook loop being spaced apart less than the corresponding dimension of the first loop, whereby to prevent accidental unhooking of the loops.

14. In a bale tie, two cooperating tie ends, one of said ends comprising a loop, the other end comprising a hook including a return bent bight, said hook being wider at the end of the bight than is said loop, said loop including a depressed intermediate portion arranged so as to lockingly engage between portions of the hook so as to prevent accidental disengagement of said ends, said hook including a portion deformed toward the axis of the tie to restrict the pathway of the loop in disengaging movement.

15. In a bale tie, a bale element having two interlocking tie ends, one of said ends defining a loop, the other end defining a loop return bent to form a hook having divergent sides, the relative width of said loops at the return bent portion being such as to cause binding and prevent direct longitudinal disengagement of the tie ends, the first loop including a deformed portion arranged to engage between and frictionally bind the divergent sides of the hook loop upon longitudinal movement of the tie ends toward each other to prevent accidental disengagement thereof, said hook loop including a portion disposed so as to cause restriction of the pathway of the first loop in disengaging movement to prevent accidental disengagement of said ends.

ALBERT F. BRADLEY.